(12) United States Patent
Takeda et al.

(10) Patent No.: US 10,338,770 B2
(45) Date of Patent: *Jul. 2, 2019

(54) DISPLAY APPARATUS AND COMPUTER-READABLE NON-TRANSITORY RECORDING MEDIUM WITH DISPLAY CONTROL PROGRAM RECORDED THEREON

(71) Applicant: KYOCERA Document Solutions Inc., Osaka (JP)

(72) Inventors: Hideki Takeda, Osaka (JP); Takashi Namii, Osaka (JP); Yumi Hirobe, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 879 days.

This patent is subject to a terminal disclaimer.

(21) Appl. No.: 14/595,997

(22) Filed: Jan. 13, 2015

(65) Prior Publication Data

US 2015/0199097 A1     Jul. 16, 2015

(30) Foreign Application Priority Data

Jan. 15, 2014   (JP) ................ 2014-005419
Jan. 15, 2014   (JP) ................ 2014-005421

(51) Int. Cl.
*G06F 17/00*   (2019.01)
*G06F 3/0482*  (2013.01)
(Continued)

(52) U.S. Cl.
CPC ........ *G06F 3/0482* (2013.01); *G06F 3/04847* (2013.01); *G06F 3/04883* (2013.01)

(58) Field of Classification Search
CPC . G06F 3/0482; G06F 3/04847; G06F 3/04883
See application file for complete search history.

(56) References Cited

U.S. PATENT DOCUMENTS 5,870,088 A * 2/1999 Washington ........ G06F 3/04847
                                                715/781
2009/0235198 A1* 9/2009 Migos ................. G06F 3/04847
                                                715/780

(Continued)

FOREIGN PATENT DOCUMENTS

JP     2013-012060    1/2013

*Primary Examiner* — Scott T Baderman
*Assistant Examiner* — Barbara M Level
(74) *Attorney, Agent, or Firm* — IP Business Solutions, LLC

(57) ABSTRACT

A display apparatus includes a display section, an operating point detecting section, a first movement information detecting section configured to detect a direction and an amount of movement from an initial point of an operator's touch of the operating point detecting section to a primary stopping point thereof, a second movement information detecting section configured to detect an amount of movement in a predetermined direction from the primary stopping point to a secondary stopping point, an amount-of-value-change calculating section configured to calculate an amount of numerical value change at each numerical display switch, a switching speed calculating section configured to calculate, from the amount of movement detected by the second movement information detecting section, a switching speed at each numerical display switch, and a display control section allowing the numerical display switch of the display section in the calculated amount of numerical value change at the calculated switching speed.

12 Claims, 18 Drawing Sheets

(51) Int. Cl.
*G06F 3/0488* (2013.01)
*G06F 3/0484* (2013.01)

(56) References Cited

U.S. PATENT DOCUMENTS

2013/0150165 A1\* 6/2013 Takahashi ............. G06F 3/0488
  463/37
2014/0078318 A1\* 3/2014 Alameh ................ G06F 3/0304
  348/207.99
2014/0313135 A1\* 10/2014 Pisters .................. G06F 3/0484
  345/173

\* cited by examiner

0→1→2→3→···→998→999→1000
AMOUNT OF NUMERICAL
VALUE CHANGE

0→2→4→6→···→996→998→1000
AMOUNT OF NUMERICAL
VALUE CHANGE

0→10→20→30→···→980→990→1000
AMOUNT OF NUMERICAL
VALUE CHANGE

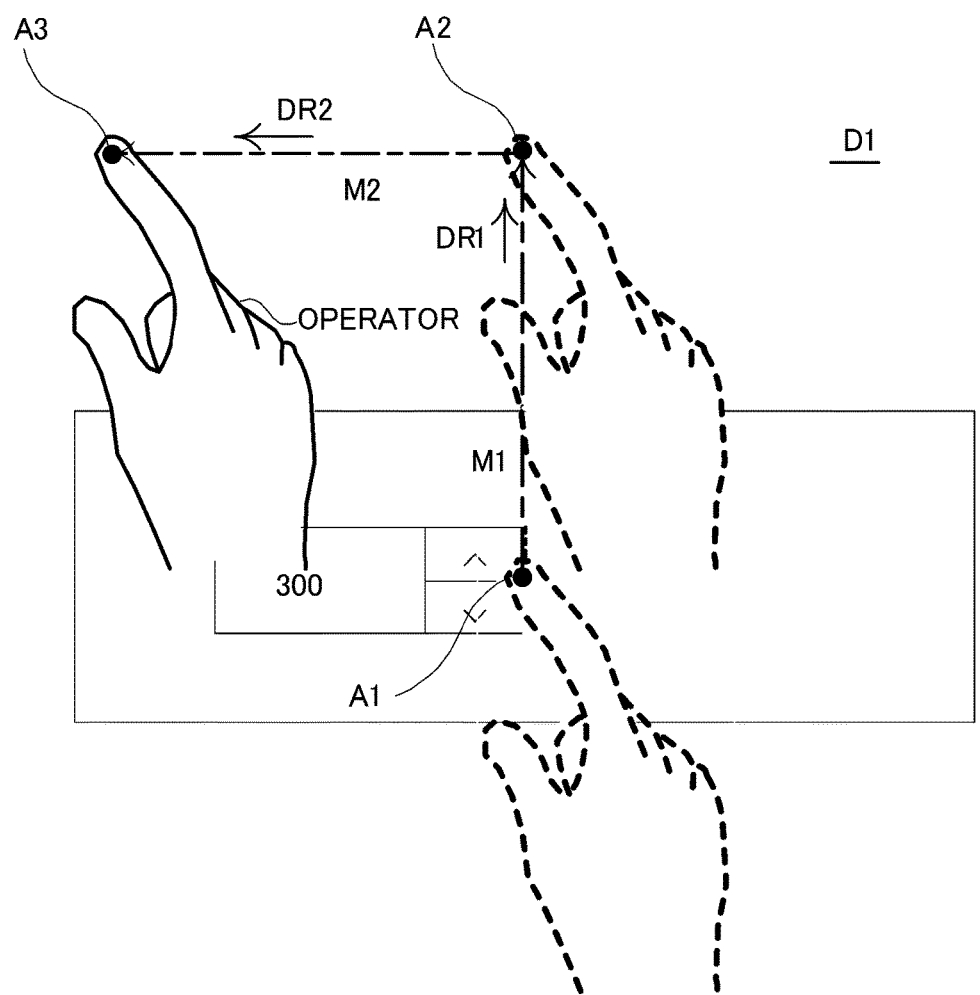

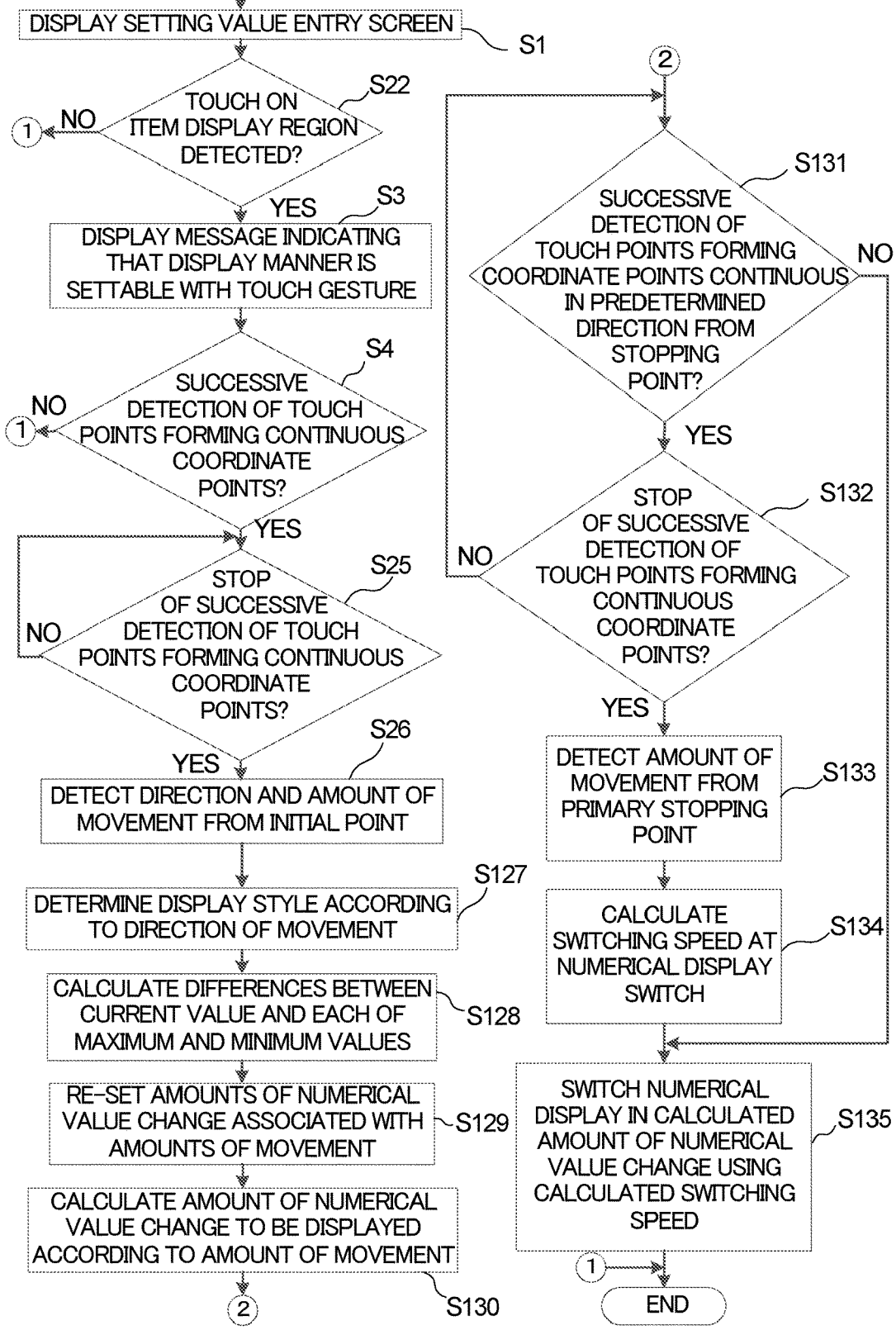

DISPLAY APPARATUS AND COMPUTER-READABLE NON-TRANSITORY RECORDING MEDIUM WITH DISPLAY CONTROL PROGRAM RECORDED THEREON

INCORPORATION BY REFERENCE

This application claims priority to Japanese Patent Application No. 2014-5419 filed on Jan. 15, 2014, and Japanese Patent Application No. 2014-5421 filed on Jan. 15, 2014, the entire contents of which are incorporated by reference herein.

BACKGROUND

The present disclosure relates to a display apparatus and a computer-readable non-transitory recording medium with a display control program recorded thereon and particularly relates to a technique for displaying one after another of numerical values on a display section.

Image forming apparatuses, mobile terminals such as smartphones, personal computers, and like devices and apparatuses display on their display section candidates for a setting value, which can be set by operators, for a function or the like operable on these devices and apparatuses and receive entry of a desired setting value using a touch panel function or the like through an operator's touch of a display screen. These devices and apparatuses switch a display of numerical values enterable as a setting value from one value to another in succession to enable the operator to readily select a desired setting value. For example, when, for enterable numerical values of 1 to 1000, the operator enters a command to switch the numerical display from one value to another in succession, the numerical values are displayed one after another in an amount of numerical value change of 1, like 1→2→3→ . . . →998→999→1000.

Furthermore, when during this successive display switches the operator is slow in selecting a value, the amount of numerical value change at subsequent display switches is increased. For example, when the operator is slow in selecting a value while the successive display switches are made in an amount of numerical value change of 1 in the above manner, the numerical values are displayed differently on the way, one after another in an amount of numerical value change of 10, like . . . →50→60→70→80→90→100→ . . . . Thus, a desired value to be selected by the operator can be reached quickly.

SUMMARY

A technique improved over the aforementioned technique is proposed as one aspect of the present disclosure.

A display apparatus according to an aspect of the present disclosure includes a display section, a display control section, an operating point detecting section, a first movement information detecting section, a second movement information detecting section, an amount-of-value-change calculating section, and a switching speed calculating section.

The display section is configured to display an image.

The display control section is configured to control a display operation of the display section.

The operating point detecting section is configured to detect an operating point where an operator has performed an operation on a display screen of the display section.

The first movement information detecting section is configured, when the operating point as an initial point and the operating points forming coordinate points continuous from the initial point are successively detected by the operating point detecting section and the successive detection of the operating points is then stopped, to detect first movement information indicating a direction and an amount of movement from the initial point to a primary stopping point where the successive detection is stopped.

The second movement information detecting section is configured, when the operating points forming coordinate points continuous from the primary stopping point are successively detected in a predetermined direction and the successive detection of the operating points is then stopped again, to detect an amount of movement from the primary stopping point to a secondary stopping point where the successive detection is stopped again.

The amount-of-value-change calculating section is configured to calculate, from the amount of movement detected by the first movement information detecting section, an amount of numerical value change at each display switch made so that the display control section allows the display section to switch a display from one to another of a plurality of numerical values in succession in increasing or decreasing order.

The switching speed calculating section is configured to calculate, from the amount of movement detected by the second movement information detecting section, a switching speed at each display switch made so that the display control section allows the display section to switch the display from one to another of the plurality of numerical values in succession in the amount of numerical value change.

The display control section is further configured to allow the display section to switch the display from one to another of the plurality of numerical values in succession in the calculated amount of numerical value change and use the calculated switching speed as the switching speed at the display switch from one to another of the plurality of numerical values.

In a computer-readable non-transitory recording medium with a display control program recorded thereon according to another aspect of the present disclosure, the display control program allows a computer to function as the aforementioned display control section, the aforementioned operating point detecting section, the aforementioned first movement information detecting section, the aforementioned second movement information detecting section, the aforementioned amount-of-value-change calculating section, and the aforementioned switching speed calculating section.

BRIEF DESCRIPTION OF THE DRAWINGS

FIG. 8 is a view showing an example where the finger is slid in a predetermined direction from a primary stopping point.

FIG. 18 is a flowchart showing another embodiment of display control in the information processing apparatus serving as the display apparatus according to the fourth embodiment.

DETAILED DESCRIPTION

Figure 1:
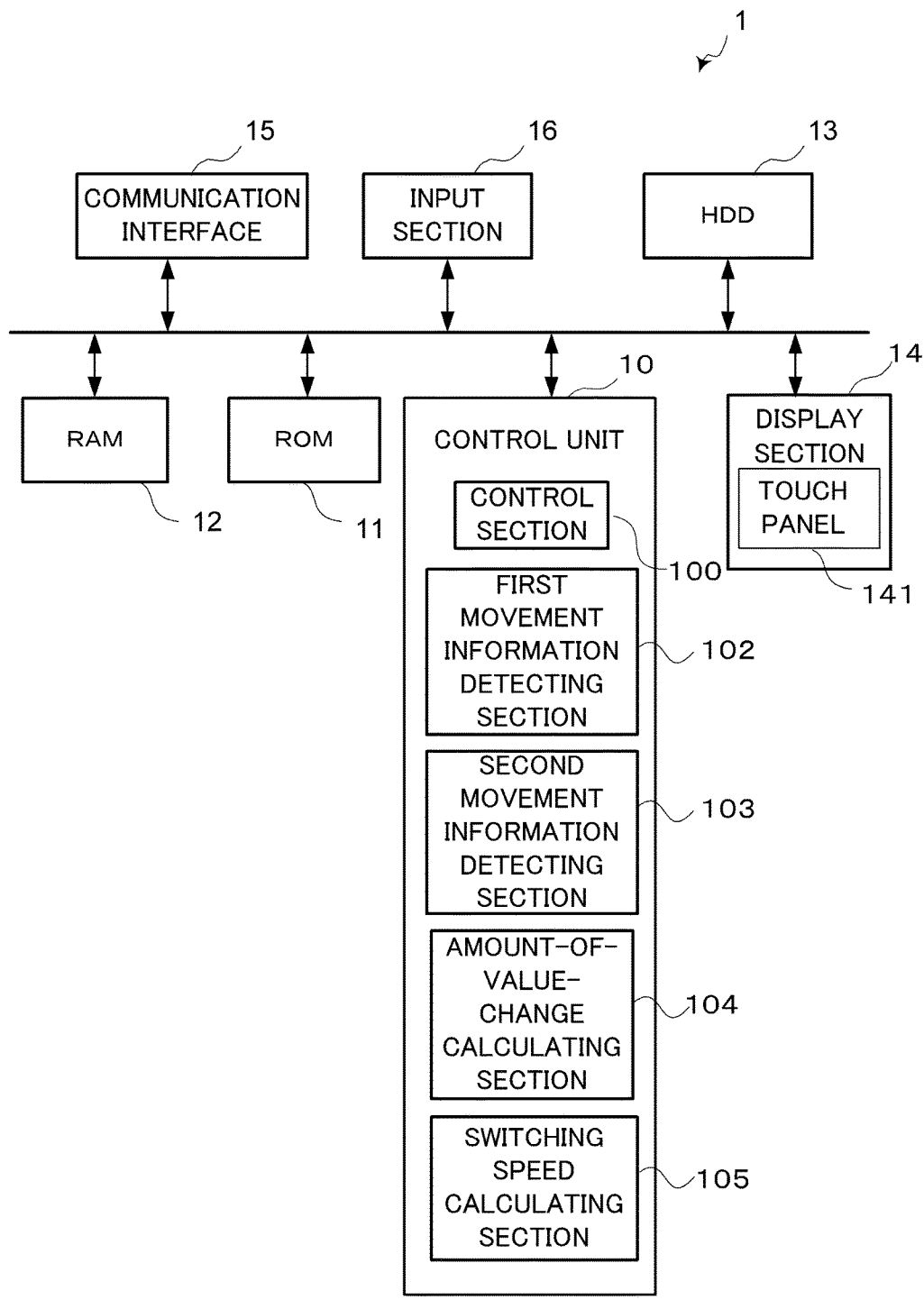
FIG. 1 is a block diagram schematically showing an internal architecture of an information processing apparatus serving as a display apparatus according to one embodiment of the present disclosure.

Hereinafter, a description will be given of a display apparatus, a display control program, and a computer-readable non-transitory recording medium with the display control program recorded thereon, all according to one embodiment of the present disclosure, with reference to the drawings. FIG. 1 is a block diagram schematically showing an internal architecture of an information processing apparatus serving as the display apparatus according to the one embodiment of the present disclosure.

The information processing apparatus 1 serving as the display apparatus according to the one embodiment of the present disclosure includes a control unit 10, a ROM 11, a RAM 12, an HDD 13, a display section 140, a communication interface 15, and an input section 16. These unit and sections can transfer data or signals to and from one another via a CPU bus.

The control unit 10 is formed of a CPU or the like and configured to govern the overall operation of the information processing apparatus 1. The ROM 11 stores an operating program on basic operations of the information processing apparatus 1. The RAM 12 is used as an operating region of the control unit 10 and for other purposes.

The HDD 13 can store, in part of its storage region, various types of data including text data and image data to be printed. The HDD 13 stores the display control program according to the one embodiment of the present disclosure. The control unit 10 operates in accordance with the display control program to function as a control section 100 (only for functions associated with the display control), a first movement information detecting section 102, a second movement information detecting section 103, an amount-of-value-change calculating section 104, and a switching speed calculating section 105. Alternatively, each of the control section 100 (only for functions associated with the display control), the first movement information detecting section 102, the second movement information detecting section 103, the amount-of-value-change calculating section 104, and the switching speed calculating section 105 of the control unit 10 may not be implemented by the operation of the control unit 10 in accordance with the display control program but may be constituted by a hardware circuit. Hereinafter, the same applies to the other embodiments unless otherwise stated.

The display 14 is formed of an LCD (liquid crystal display) or the like and displays contents of various data, and operation guidance and the like for the operator operating the information processing apparatus 1. The communication interface 15 serves as an interface for data communication with multifunction peripherals and so on connected over a network.

The display section 14 is provided with a touch panel 141. The touch panel 141 is provided as a display screen of the display section 14 and configured to detect an operator's touch of the display screen together with a touch point (coordinate point). When detecting the operator's touch, the touch panel 141 outputs a detection signal indicating the touch point to the control section 100, the first movement information detecting section 102, the second movement information detecting section 103, and so on. The touch panel 141 encompasses a touch panel operable to detect an operator's finger or the like when the operator's finger or the like, even if not touching the display screen, comes within a certain small distance of the display screen. Therefore, the term "touch" used in this embodiment includes a state where a finger or the like coming within the certain small distance of the display screen is detected, without an actual touch of the display screen, by the function of the touch panel 141, with the consideration of this state as a substantial touch. The "touch point" in this embodiment is an example of the operating point defined in "What is claimed is".

When the operator slides his/her finger on the display screen of the display section 14 while keeping it in touch with the display screen, the touch panel 141 outputs to the control section 100 detection signals indicating a series of points of movement from an initial point at which the touch has been first detected to a latest position at which the touch is last detected. The touch panel 141 is an example of the operating point detecting section defined in "What is claimed is".

The input section 16 is formed of a keyboard, a mouse or the like, through which various operation commands are entered into the information processing apparatus 1 by the operator. For example, a command to print a document is entered on the input section 16.

The control unit 10, as described previously, includes the control section 100, the first movement information detecting section 102, the second movement information detecting section 103, the amount-of-value-change calculating section 104, and the switching speed calculating section 105.

The control section 100 governs the overall operation control of the information processing apparatus 1.

The first movement information detecting section 102 is configured, when a touch point as an initial point and touch points forming coordinate points continuous from the initial point are successively detected by the touch panel 141 and the successive detection of the touch points is then stopped with the detection of a stopping point (primary stopping point), to detect first movement information indicating a direction and an amount of movement from the initial point to the primary stopping point based on the detection signals acquired from the touch panel 141.

The second movement information detecting section 103 is configured, when touch points forming coordinate points continuous from the primary stopping point are successively detected in a predetermined direction and the successive detection of the touch points is then stopped with the detection of another stopping point (secondary stopping point), to detect an amount of movement from the primary stopping point to the secondary stopping point based on the detection signals acquired from the touch panel 141.

The predetermined direction is, for example, a direction orthogonal to a direction of movement from the initial point toward the primary stopping point. However, the predetermined direction is not limited to the above direction but may be any other direction.

The amount-of-value-change calculating section 104 is configured to calculate, from the amount of movement detected by the first movement information detecting section 102, an amount of numerical value change at each display switch made so that the control section 100 allows the display section 14 to switch a display from one to another of a plurality of numerical values in succession in increasing or decreasing order.

The switching speed calculating section 105 is configured to calculate, from the amount of movement detected by the second movement information detecting section 103, a switching speed at each display switch made so that the control section 100 allows the display section 14 to switch the display from one to another of the plurality of numerical values in succession in the calculated amount of numerical value change.

The control section 100 is configured to serve as the display control section defined in "What is claimed is" to control a display operation of the display section 14. The control section 100 is further configured to allow the display section 14 to switch the display from one to another of the plurality of numerical values in succession in increasing or decreasing order. Specifically, the control section 100 is configured to allow the display section 14 to switch the display from one to another of the numerical values as display objects in succession in the amount of numerical value change calculated by the amount-of-value-change calculating section 104, using the switching speed calculated by the switching speed calculating section 105 as the switching speed at the display switch from one to another of the numerical values.

For example, when, in displaying one after another of numerical values of 0 to 1000, the control section 100 switches the numerical display in increments of 1, like 0→1→2→3→ . . . →998→999→1000, the amount of numerical value change is 1.

For another example, when, in displaying one after another of numerical values of 0 to 1000, the control section 100 switches the numerical display in increments of 10, like 0→10→20→ . . . → 980→990→1000, the amount of numerical value change is 10.

The switching speed used herein refers to the time taken, when the control section 100 switches the display from one to another of a plurality of numerical values in succession in the amount of numerical value change, to change from the value just displayed to the next value to be displayed, in other words, a display period during which one of the plurality of numerical values as display objects is displayed.

Figure 2:
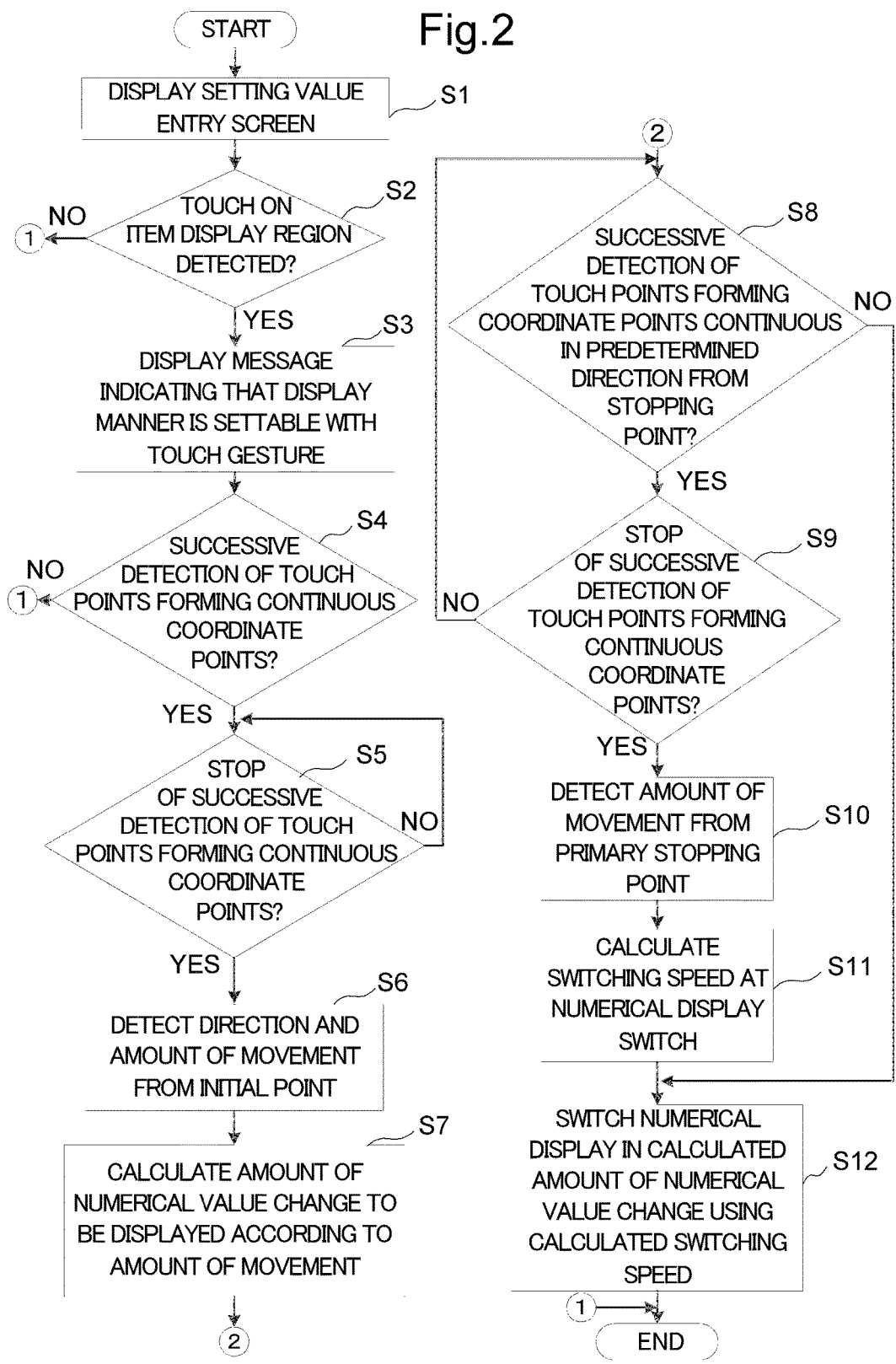
FIG. 2 is a flowchart showing a first embodiment of display control in the information processing apparatus.

Next, a description will be given of a first embodiment of display control over the display section 14 in the information processing apparatus 1. FIG. 2 is a flowchart showing the first embodiment of display control in the information processing apparatus 1.

Figure 3:
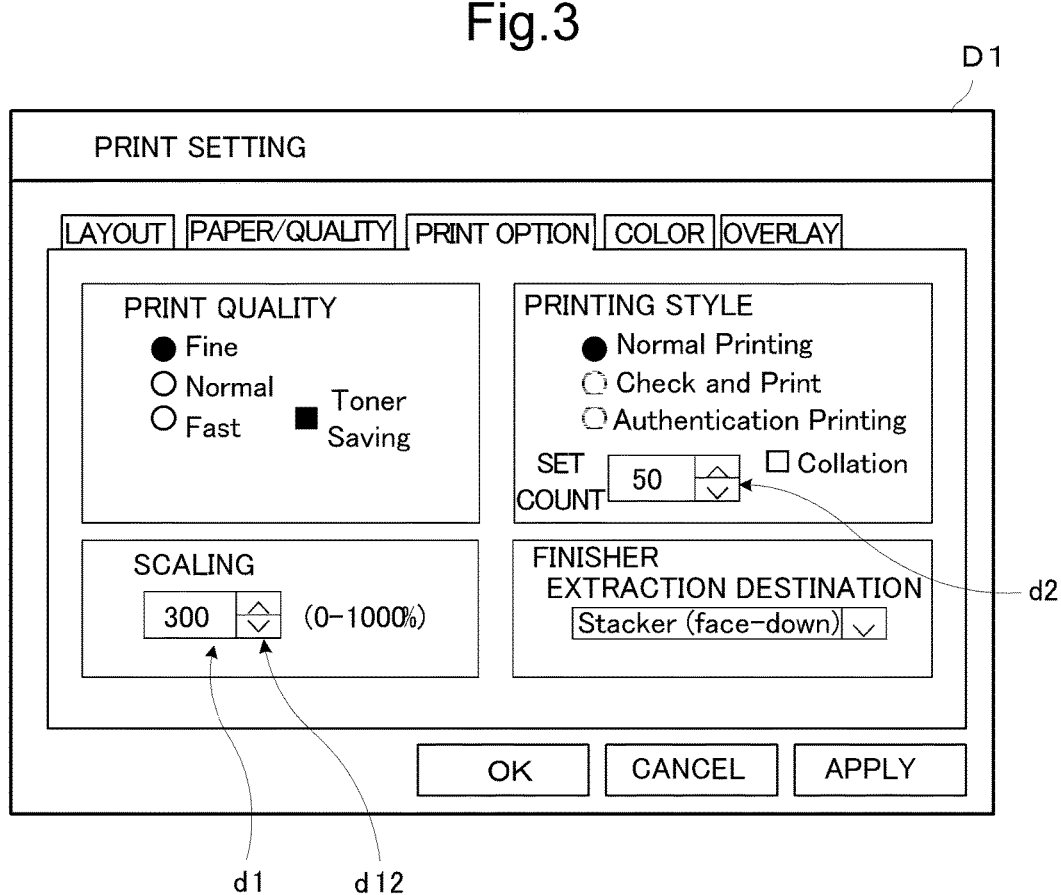
FIG. 3 is a view showing an example of a display screen of a display section.

FIG. 3 is a view showing an example of a display screen of the display section 14.

When, with a word processor or like software run on the information processing apparatus 1, the operator enters a command to print a document on the input section 16, the control section 100 runs a printer driver based on this print command. The display section 14 displays, under the display control of the control section 100, a print setting screen D1 as shown in FIG. 3 (S1).

This print setting screen D1 includes a scaling factor setting image display region d1 for use in specifying the scaling factor of a print image and/or a set count setting image display region d2 for use in specifying the number of copy sets. The scaling factor setting image display region d1 displays an image for use in receiving from the operator entry of an enlargement or reduction factor as a setting value for the function of scaling a print image which is one of operable functions possessed by the information processing apparatus 1. The set count setting image display region d2 displays an image for use in receiving from the operator entry of a setting value for the function of setting the number of copy sets which is also one of operable functions possessed by the information processing apparatus 1. In other words, the print setting screen D1 is a setting value entry screen for use in receiving entry of setting values for these functions.

When, with the print setting screen D1 displayed on the display section 14, the operator touches, for example, the scaling factor setting image display region d1 with his/her finger, the touch panel 141 detects a coordinate point on the display screen corresponding to the operator's touch point. If the detected coordinate point coincides with a coordinate point previously stored as the coordinate point of the scaling factor setting image display region d1, the control section 100 detects that the operator has touched the scaling factor setting image display region d1.

Figure 4:
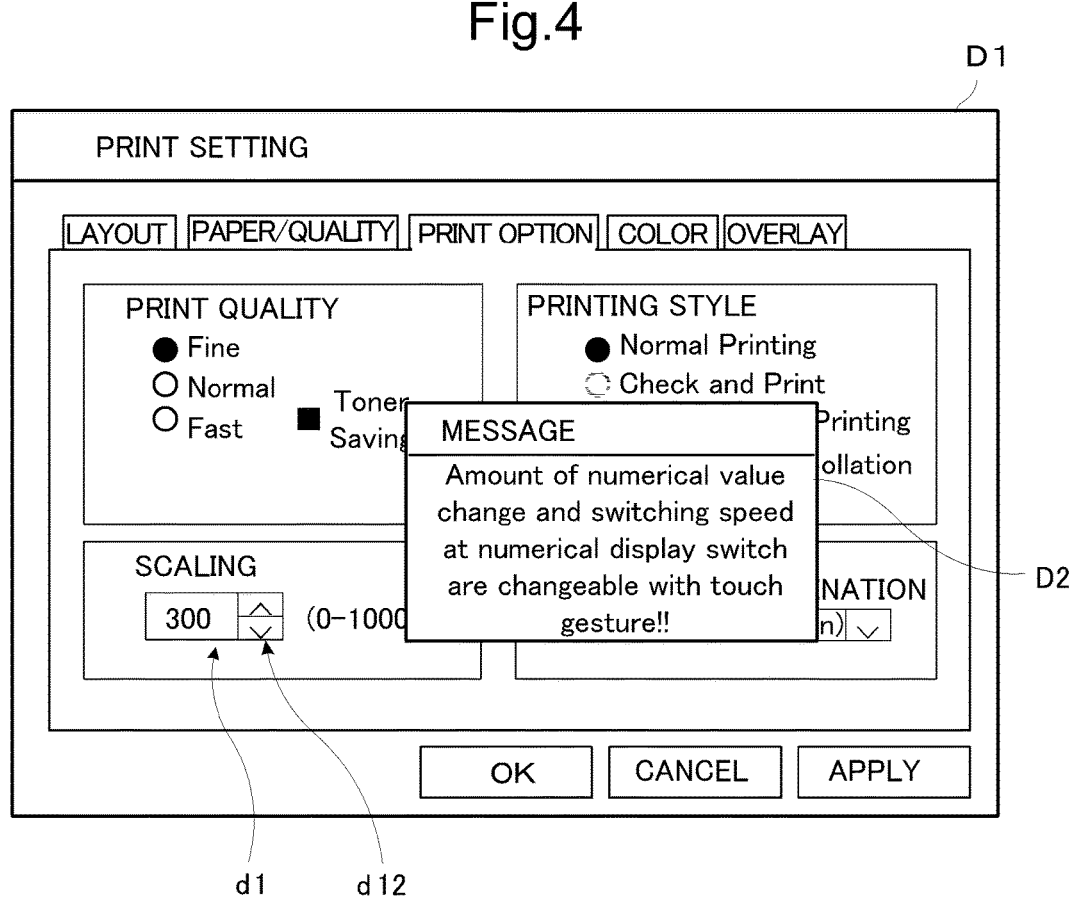
FIG. 4 is a view showing an example of the display screen of the display section.

When the operator's touch of a region displaying an image for receiving entry of a setting value for a function (the scaling factor setting image display region d1 in this case) has been detected in the above manner (YES in S2), the control section 100 allows the display section 14 to display a message indicating that the amount of numerical value change and the switching speed in switching a numerical display representing the setting value can be set with an operator's touch of the display screen (S3). For example, the control section 100 allows the display section 14 to display a message screen D2 in the form of a popup window, as shown as an example in FIG. 4, on the print setting screen D1. The control section 100 allows the display section 14 to stop the display of the message screen D2 after the elapse of a predetermined time (for example, five seconds). If NO in S2, the process ends.

Meanwhile, the first movement information detecting section 102 stores as an initial point the coordinate point of the touch detected in S2. Then, when the operator slides his/her finger placed on the initial point in any direction while keeping it in touch with the display screen of the display section 14, the touch panel 141 outputs, to the first movement information detecting section 102, respective detection signals indicating touch points changing with time according to the finger's movement.

The first movement information detecting section 102 determines whether the coordinate points corresponding to the touch points indicated by the detection signals acquired from the touch panel 141 are coordinate points continuous (connected in series) from the initial point (S4). If NO in S4, the process ends.

While it is successively determined that the coordinate points corresponding to the touch points indicated by the detection signals are such continuous coordinate points as described above (YES in S4), the first movement information detecting section 102 continues to determine whether the receipt of detection signals indicating the above continuous coordinate points is continued (NO in S5).

When the receipt of detection signals indicating the above continuous coordinate points is terminated, i.e., if the first movement information detecting section 102 determines that the detection of touch points indicating the above coordinate points continuous from the initial point has finished (YES in S5), responding that the operator has stopped the sliding of his/her finger from the initial point, the first movement information detecting section 102 detects the direction and amount of movement from the initial point to a primary stopping point which is the last touch point where the sliding has been stopped, based on the coordinate points corresponding to the initial and primary stopping points indicated by the detection signals (S6).

Figure 5:
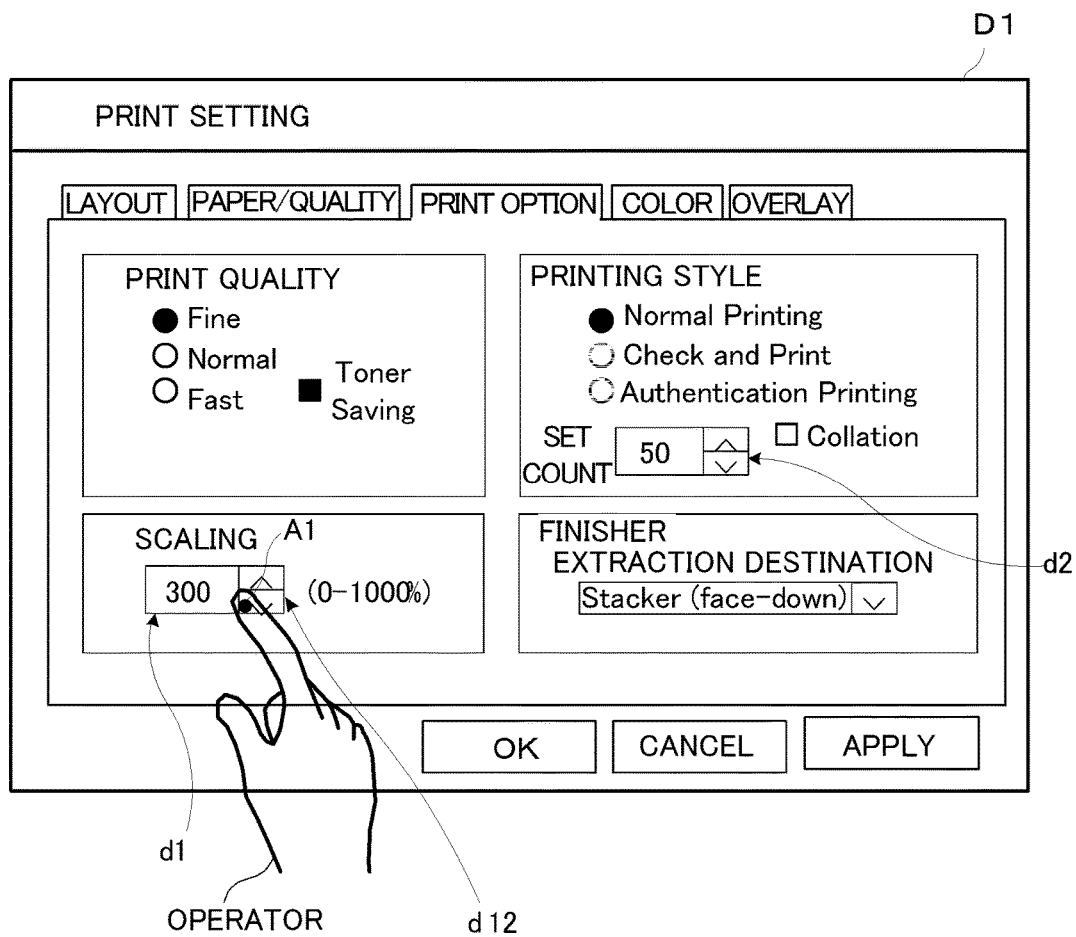
FIG. 5 is a view showing a state where an operator touches a scaling factor setting image display region with his/her finger.

The process up to this point will be described below in association with the operations of the operator. For example, when, as shown in FIG. 5, the operator touches, with his/her index finger, the scaling factor setting image display region d1 of the print setting screen D1 displayed on the display section 14, the first movement information detecting section 102 stores the touch point as an initial point A1.

Figure 6:
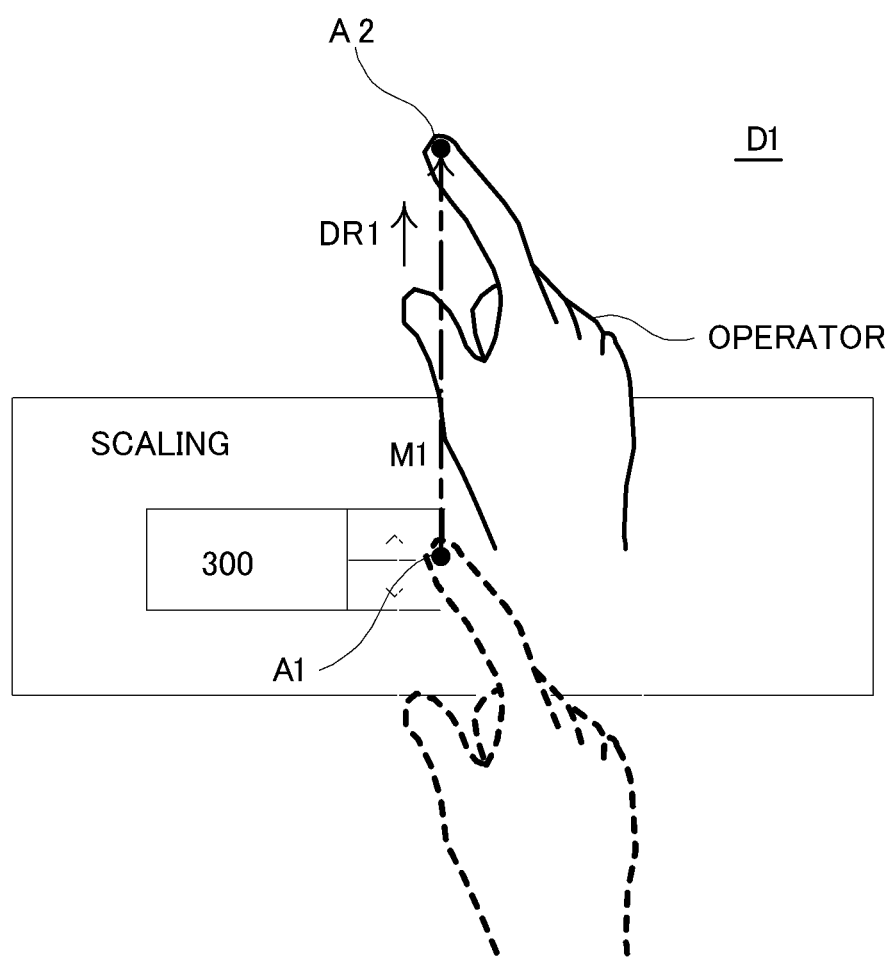
FIG. 6 is a view showing how the operator slides his/her finger on the display screen.

Subsequently, when, as shown in FIG. 6, the operator slides his/her index finger from the initial point A1 and stops the sliding movement at a certain point A2, the first movement information detecting section 102 stores a coordinate point corresponding to the point A2 as a primary stopping point A2 and calculates the amount of movement M1 from the initial point A1 to the primary stopping point A2. The first movement information detecting section 102 further calculates the direction of movement DR1 from the initial point A1 toward the primary stopping point A2.

Subsequently, the amount-of-value-change calculating section 104 calculates an aforementioned amount of numerical value change according to the amount of movement detected in S6 (S7). The amount-of-value-change calculating section 104 previously stores, for example, various amounts of movement and their associated amounts of numerical value change in a correspondence relation in the form of a data table. The amount-of-value-change calculating section 104 calculates the amount of numerical value change by reading this value associated with the detected amount of movement from the data table. Alternatively, the amount-of-value-change calculating section 104 may previously store respective factors associated with the various amounts of movement and calculate the amount of numerical value change using the factor associated with the detected amount of movement.

The HDD 13 can store, in part of its storage region, various types of data including text data and image data to be printed. The HDD 13 stores the display control program according to the one embodiment of the present disclosure.

The control unit 10 operates in accordance with the display control program to function as a control section 100 (only for functions associated with the display control), a first movement information detecting section 102, a second movement information detecting section 103, an amount-of-value-change calculating section 104, and a switching speed calculating section 105.

Figure 7A:
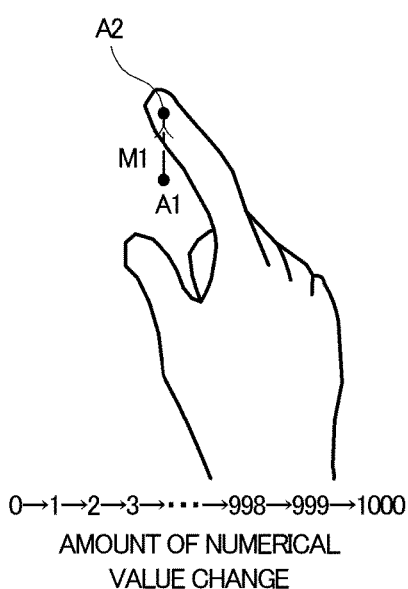
FIGS. 7A, 7B, and 7C are views showing an operator's finger slid in different amounts of sliding movement.

Specifically, as has been described with reference to FIGS. 5 and 6, when the first movement information detecting section 102 detects the amount of movement M1 from the initial point A1 to the primary stopping point A2, the amount-of-value-change calculating section 104 calculates an amount of numerical value change associated with the amount of movement M1. For example, if as shown in FIG. 7A the amount of movement M1 of the finger slid from the initial point A1 by the operator is small (for example, one-tenth of an after-mentioned amount of movement M110), the amount-of-value-change calculating section 104 calculates an amount of numerical value change so that the control section 100 can switch the numerical display from one to another of numerical values in increments of 1, like 0→1→2→3→ . . . →998→999→1000.

Figure 7B:
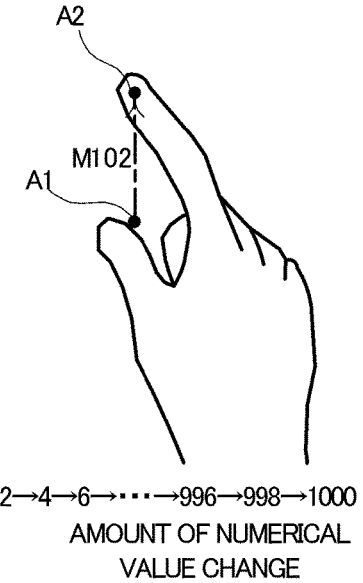

Alternatively, as shown in FIG. 7B, at an amount of movement M102 greater than the amount of movement M1 (for example, twice the amount of movement M1), the amount-of-value-change calculating section 104 calculates an amount of numerical value change so that the control section 100 can switch the numerical display from one to another of the numerical values in increments of 2, like 0→2→4→6→ . . . →996→998→1000.

Figure 7C:
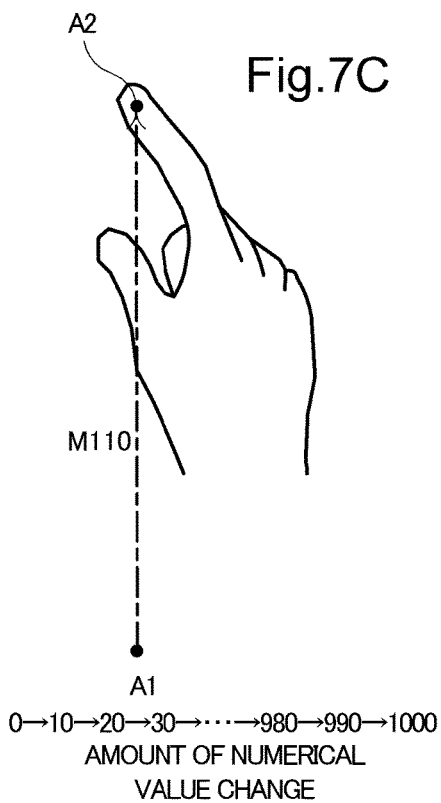

Still alternatively, as shown in FIG. 7C, at an amount of movement M110 much greater than the amount of movement M1 (for example, ten times the amount of movement M1), the amount-of-value-change calculating section 104 calculates an amount of numerical value change so that the control section 100 can switch the numerical display from one to another of the numerical values in increments of 10, like 0→10→20→30→ . . . →980→990→1000.

Thus, by adjusting the amount of sliding movement M1 when the operator slides his/her finger in touch with the display screen of the display section 14, the amount (width) of numerical value change in switching the numerical display in the scaling factor setting image display region d1 from a numerical value being currently displayed to the next numerical value to be displayed can be set at a desired value.

Subsequently, the second movement information detecting section 103 determines whether the coordinate points corresponding to touch points indicated by detection signals acquired from the touch panel 141 are coordinate points continuous in the predetermined direction from the primary stopping point (S8).

So long as it is successively determined that the coordinate points corresponding to the touch points indicated by the detection signals are coordinate points continuous from the primary stopping point (YES in S8), the second movement information detecting section 103 continues to determine whether the receipt of detection signals indicating the above continuous coordinate points is continued (NO in S9, S8).

When the receipt of detection signals indicating the above continuous coordinate points is terminated, i.e., if the second movement information detecting section 103 determines that the detection of touch points indicating the above coordinate points continuous from the primary stopping point has finished (YES in S9), responding that the operator has stopped the sliding of his/her finger in the predetermined direction from the primary stopping point, the second movement information detecting section 103 detects the amount of movement from the primary stopping point to a secondary stopping point which is the last touch point where the sliding has been stopped, based on the coordinate points corresponding to the primary and secondary stopping points indicated by the detection signals (S10).

This process will be described below in association with the operations of the operator. For example, as shown in FIG. 8, the operator slides his/her index finger from the primary stopping point A2 in the predetermined direction, for example, in a direction DR2 orthogonal to the direction of movement DR1, and stops the sliding movement at a certain point A3, the second movement information detecting section 103 stores a coordinate point corresponding to the point A3 as a secondary stopping point A3 and calculates the amount of movement M2 from the primary stopping point A2 to the secondary stopping point A3.

Subsequently, the switching speed calculating section 105 calculates, according to the amount of movement detected in S10, a switching speed at each display switch made so that the control section 100 allows the display section 14 to switch the numerical display from one to another of the numerical values in succession in the calculated amount of numerical value change (S11). The switching speed calculating section 105 previously stores, for example, various amounts of movement and their associated switching speeds in a correspondence relation in the form of a data table. The switching speed calculating section 105 calculates the switching speed by reading this value associated with the detected amount of movement from the data table. Alternatively, the switching speed calculating section 105 may previously store respective factors associated with the various amounts of movement and calculate the switching speed using the factor associated with the detected amount of movement.

Figure 9A:
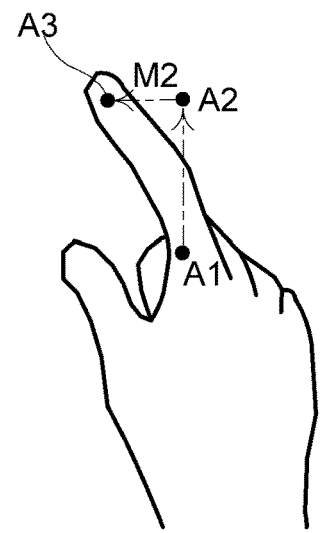
FIGS. 9A, 9B, and 9C are views showing different sliding movements and different amounts of sliding movement of the finger from an initial point to various secondary stopping points.

As has been described with reference to FIG. 8, when the second movement information detecting section 103 detects the amount of movement M2 from the primary stopping point A2 to the secondary stopping point A3, the switching speed calculating section 105 calculates a display switching speed associated with the amount of movement M2. For example, if as shown in FIG. 9A the amount of movement M2 of the finger slid from the primary stopping point A2 by the operator is small (for example, one-tenth of an aftermentioned amount of movement M210), the switching speed calculating section 105 calculates a switching speed so that the control section 100 can switch the numerical display every n seconds.

Figure 9B:
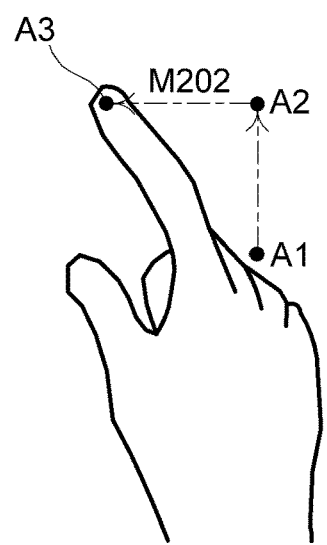

Alternatively, as shown in FIG. 9B, at an amount of movement M202 greater than the amount of movement M2 (for example, twice the amount of movement M2), the switching speed calculating section 105 calculates a switching speed so that the control section 100 can switch the numerical display every 2n seconds.

Figure 9C:
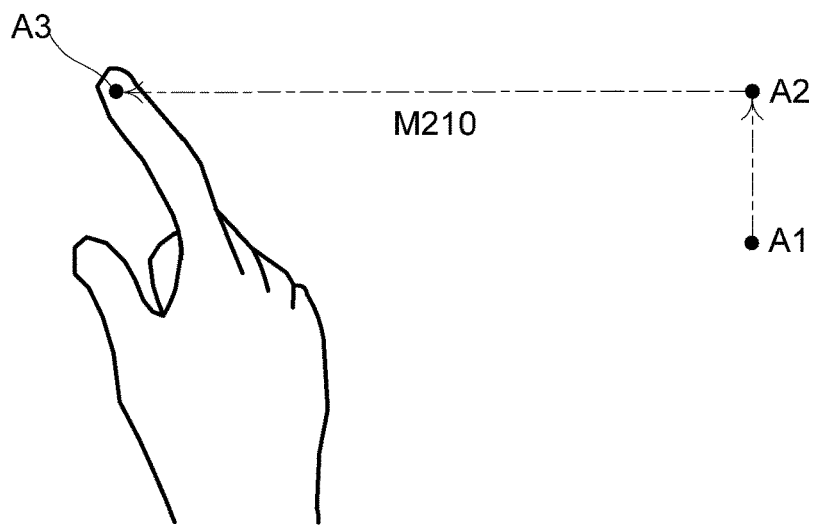

Still alternatively, as shown in FIG. 9C, at an amount of movement M210 much greater than the amount of movement M2 (for example, ten times the amount of movement M2), the switching speed calculating section 105 calculates a switching speed so that the control section 100 can switch the numerical display every 10n seconds.

Thus, by adjusting the amount of sliding movement M2 when the operator slides his/her finger on the display screen of the display section 14 in the predetermined direction from the primary stopping point A2, the speed (period) for switching the numerical display in the scaling factor setting image display region d1 from the numerical value being displayed to the next numerical value to be displayed can be set at a desired value.

Thereafter, when the touch panel 141 detects an operator's touch of a pull-up/pull-down key image d12 of the scaling factor setting image display region d1, the control section 100 allows the display section 14 to switch the display from one to another of a plurality of numerical values as display objects in succession using the amount of numerical value change calculated by the amount-of-value-change calculating section 104 in S7 and the switching speed calculated by the switching speed calculating section 105 in S11 (S12).

Thus, the operator can adjust both the amount of numerical value change and the switching speed of numerical values to be switchably displayed as candidates for a setting value on the display section 14, by s simple series of operations including a touch of the display screen of the display section 14 with his/her finger and sliding movements of the finger in two directions on the display screen to adjust the amounts of sliding movements in these directions.

The operator can easily make, by sliding his/her finger on the display screen, adjustments such as increasing the switching speed to quickly reach the display of a desired numerical value when numerical values are displayed one after another in increments of 1 or decreasing the switching speed to make transition of numerical values displayed more visible when the numerical values are displayed one after another in increments of 10.

Since the operator can change, with a seamless series of movements of his/her finger, both the amount of numerical value change and the switching speed when numerical values are displayed one after another, the setting change of the amount of numerical value change and the switching speed can be made more efficiently than when it is made by running a special program as is conventionally done.

Figure 10:
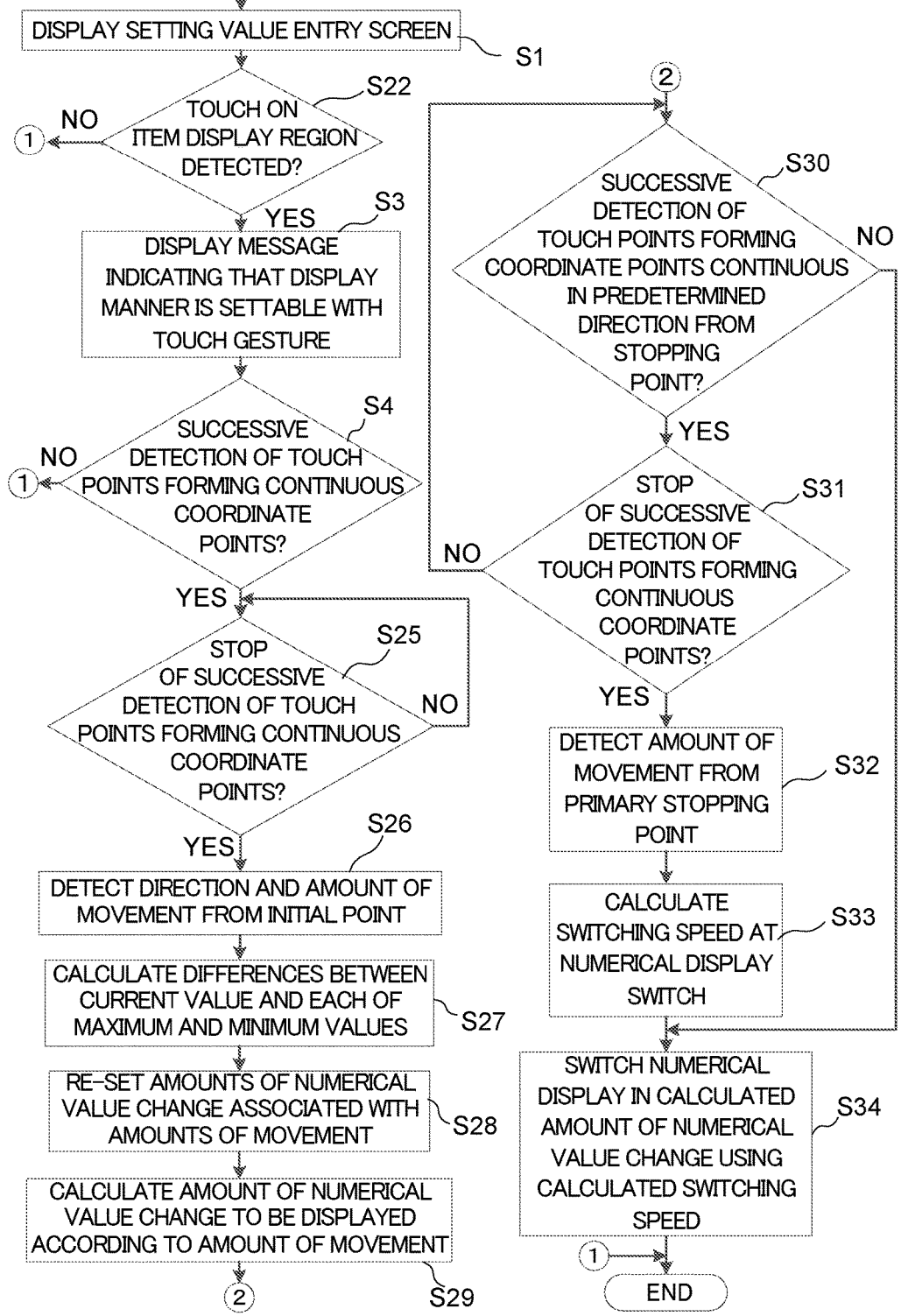
FIG. 10 is a flowchart showing a second embodiment of display control in the information processing apparatus.

Next, a description will be given of a second embodiment of display control in the information processing apparatus 1. FIG. 10 is a flowchart showing the second embodiment of display control in the information processing apparatus 1. Further description of the same pieces of processing as those in the first embodiment shown in FIG. 2 will be omitted.

In the second embodiment, when the first movement information detecting section 102 determines that the detection of touch points indicating coordinate points continuous from the initial point has finished (YES in S25) and detects the direction and amount of movement from the initial point to the primary stopping point (S26), the amount-of-value-change calculating section 104 calculates a difference between a current value which is a numerical value being displayed at this point in time (a numerical value which the control section 100 allows the display section 14 to display at the time of detection of the initial point in S22) and a maximum value assignable as a setting value and a difference between the current value and a minimum value assignable as a setting value (S27).

Then, the amount-of-value-change calculating section 104 re-sets, depending upon the calculated difference, the respective amounts of numerical value change associated with the various amounts of movement (S28).

For example, suppose that the range of numerical values assignable as a setting value is 0 to 1000 as described previously. When in this case one or both of the absolute values of the differences between the current value and each of the maximum and minimum values (hereinafter referred to simply as "differences") are equal to or greater than a predetermined value, for example, 500, the amount-ofvalue-change calculating section 104 retains the amounts of numerical value change associated with the amounts of movement stored in the data table, insofar as the amounts of movement is concerned with, in two directions toward the maximum and minimum values, one or both directions leading to the difference equal to or greater than the predetermined value.

On the other hand, when one of the differences is smaller than 500, the amount-of-value-change calculating section 104 re-sets the amounts of numerical value change associated with the amounts of movement stored in the data table by changing the amounts of numerical value change according to the value representing the difference, i.e., the ratio of the value representing the difference to 500, insofar as the amounts of movement is concerned with, in the two directions toward the maximum and minimum values, one direction leading to the difference smaller than the predetermined value. For example, the amounts of numerical value change associated with the amounts of movement are decreased as the above ratio is greater.

Thereafter, the amount-of-value-change calculating section 104 calculates an amount of numerical value change associated with the amount of movement detected in S26, based on the data table containing the re-set amounts of numerical value change (S29).

Thus, when the remaining group of numerical values (the number of remaining numerical values) assignable as a setting value is small, it is possible to restrict the amount of numerical value change at the numerical display switch, calculated according to the amount of movement specified by an operator's order and detected by the first movement information detecting section 102, thus providing a numerical display making it easy for the operator to find a desired value in a small number of remaining candidate numerical values for the setting value.

Also when the remaining group of numerical values (the number of remaining numerical values) assignable as a setting value is large, the amount-of-value-change calculating section 104 may re-set the amounts of numerical value change associated with the amounts of movement stored in the data table by changing the amounts of numerical value change according to the value representing the aforementioned difference, i.e., the ratio of the value representing the difference from 500 with respect to 500. For example, the amount-of-value-change calculating section 104 increases the amounts of numerical value change associated with the amounts of movement as the above ratio is smaller.

Figure 11:
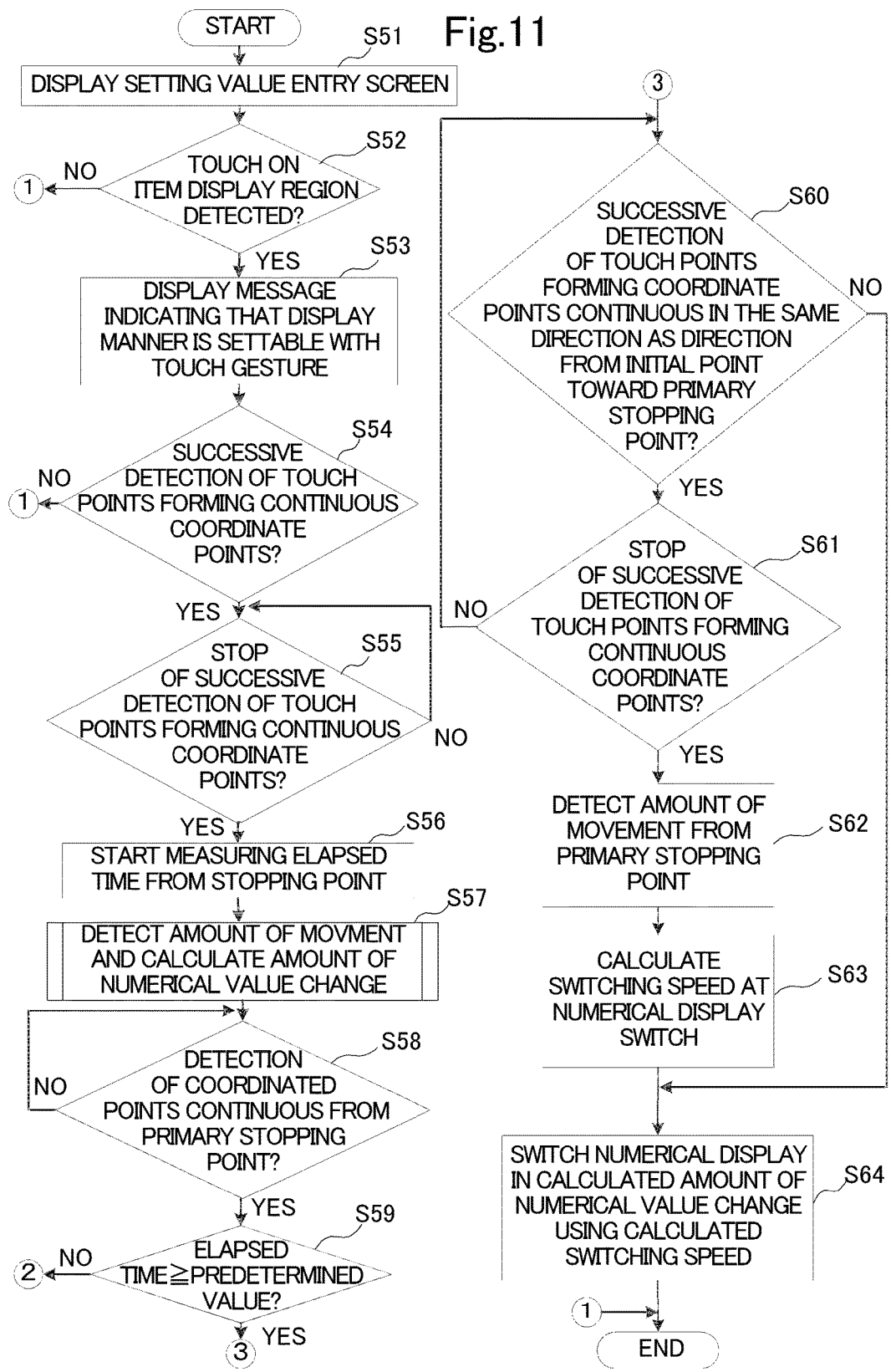
FIG. 11 is a flowchart showing a third embodiment of display control in the information processing apparatus 1.

Next, a description will be given of a third embodiment of display control in the information processing apparatus 1. FIG. 11 is a flowchart showing the third embodiment of display control in the information processing apparatus 1. Further description of the same pieces of processing as those in the first or second embodiment will be omitted.

In the third embodiment, when the first movement information detecting section 102 determines that a predetermined number of touch points indicating coordinate points continuous from an initial point have been successively detected (YES in S54) and then determines that the successive detection of the touch points indicating coordinate points continuous from the initial point has been stopped (YES in S55), the second movement information detecting section 103 starts measuring the elapse of time from the time point at which the successive detection has been stopped, i.e., the time point of detection of a primary stopping point, for example, with an internal timer of the control unit 10 (S56). Furthermore, in parallel with the above measurement, S6 and S7 in the first embodiment or S26 to S29 in the second embodiment are performed (S57).

Then, when touch points indicating coordinate points continuous from the primary stopping point have been detected (YES in S58), the second movement information detecting section 103 determines whether or not the elapsed time from the measurement start in S56 has reached a predetermined time (for example, two seconds) (S59).

If the second movement information detecting section 103 determines that the elapsed time has reached the predetermined time (YES in S59), the second movement information detecting section 103 determines whether or not a predetermined number of touch points indicating coordinate points continuous from the primary stopping point have been successively detected in the same direction as the direction of movement detected by the first movement information detecting section 102 (i.e., as the direction of movement from the initial point toward the primary stopping point) (S60).

When the second movement information detecting section 103 determines that the predetermined number of touch points indicating coordinate points continuous from the primary stopping point have been successively detected (YES in S60) and then determines that the successive detection of touch points indicating coordinate points continuous from the primary stopping point has finished (YES in S61), the second movement information detecting section 103 detects the amount of movement from the primary stopping point to the secondary stopping point, based on the coordinate points corresponding to the primary and secondary stopping points indicated by the detection signals (S62). Thereafter, in the same manner as in the second embodiment, the calculation of the switching speed and the numerical display switch using the switching speed and the amount of numerical value change calculated in S57 are performed (S63, S64).

On the other hand, if in S59 the second movement information detecting section 103 determines that the elapsed time has not reached the predetermined time (NO in S59), the same pieces of processing as those in S30 and subsequent steps shown in FIG. 10 (not shown in FIG. 11) are performed, that is, the setting of the switching speed according to the amount of movement from the primary stopping point is made on the grounds that the coordinate points corresponding to touch points indicated by detection signals acquired from the touch panel 141 are coordinate points continuous in the aforementioned predetermined direction from the primary stopping point.

For example, when the operator slides his/her index finger from an initial point, stops the slide at a primary stopping point as shown in FIG. 6, and, after the elapse of the aforementioned predetermined time, further slides the index finger, the second movement information detecting section 103 detects an amount of movement produced by the further slide from the primary stopping point in the same direction as the direction in which the operator's index finger has moved from the initial point to the primary stopping point and the switching speed calculating section 105 calculates a switching speed associated with this amount of movement.

Figure 12:
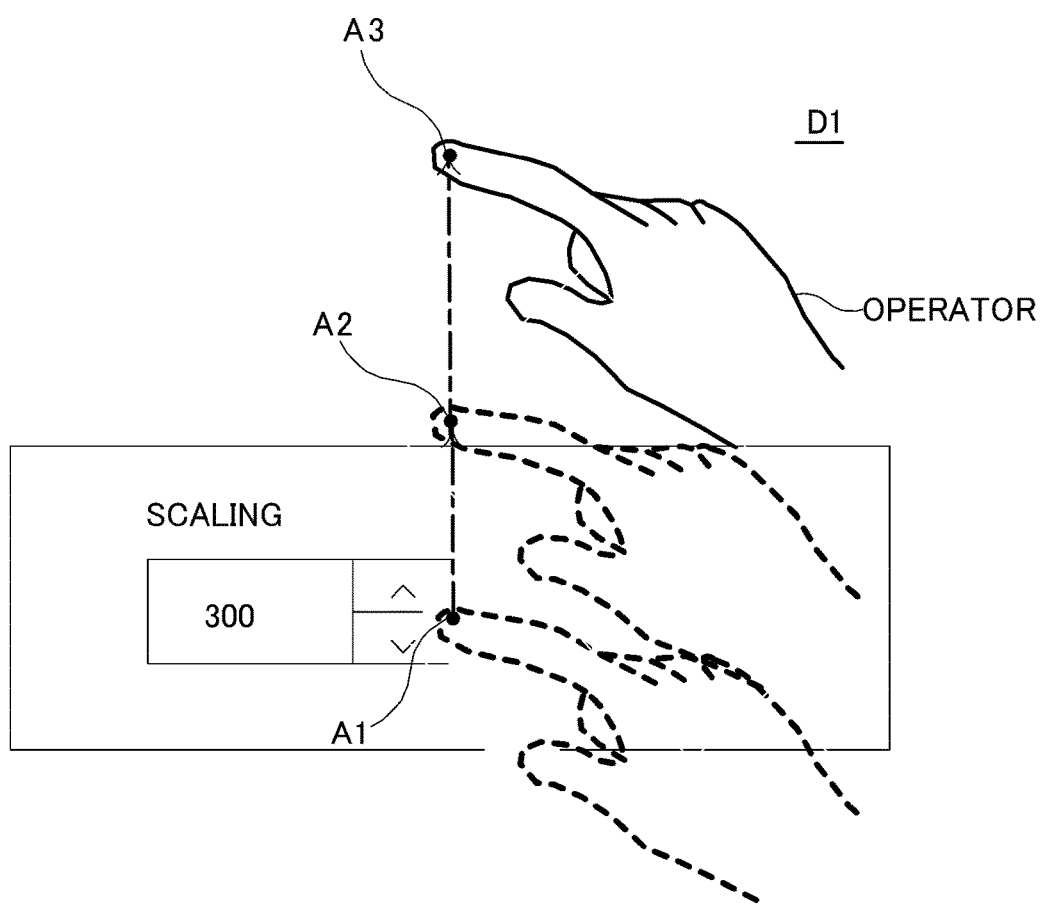
FIG. 12 is a view showing an example of a sliding movement from a primary stopping point in the same direction as that toward the primary stopping point.

Therefore, as shown in FIG. 12, by sliding an operator's finger from an initial point to a primary stopping point, stopping the finger at the primary stopping point for the predetermined time, and then sliding the finger again in the same direction as the sliding movement to the primary stopping point, the operator can adjust both the amount of movement M1 for the calculation of the amount of numerical value change and the amount of movement M2 for the calculation of the switching speed with just changes in the respective amounts of sliding movements and can set the switching speed at a desired value.

Thus, the operator can set both the amount of numerical value change and the switching speed without changing the direction of primary sliding movement of his/her finger, which further increases the operability.

In a general display apparatus, in order to increase the operator's visibility and operability when its display section switches the display from one to another of numerical values indicating candidates for a setting value in succession, it is preferred that the operator could change, as appropriate, the amount (width) of numerical value change at the display switch and could also change, as appropriate, the speed at the display switch. Furthermore, the operation in changing the amount of numerical value change and the switching speed should preferably be easy for the operator.

In the above embodiments, the amount of numerical value change and the display switching speed of numerical values to be displayed one after another, on the display section, as candidates for a setting value for a function operable on the apparatus can be changed with a simple operation of the operator.

Figure 13:
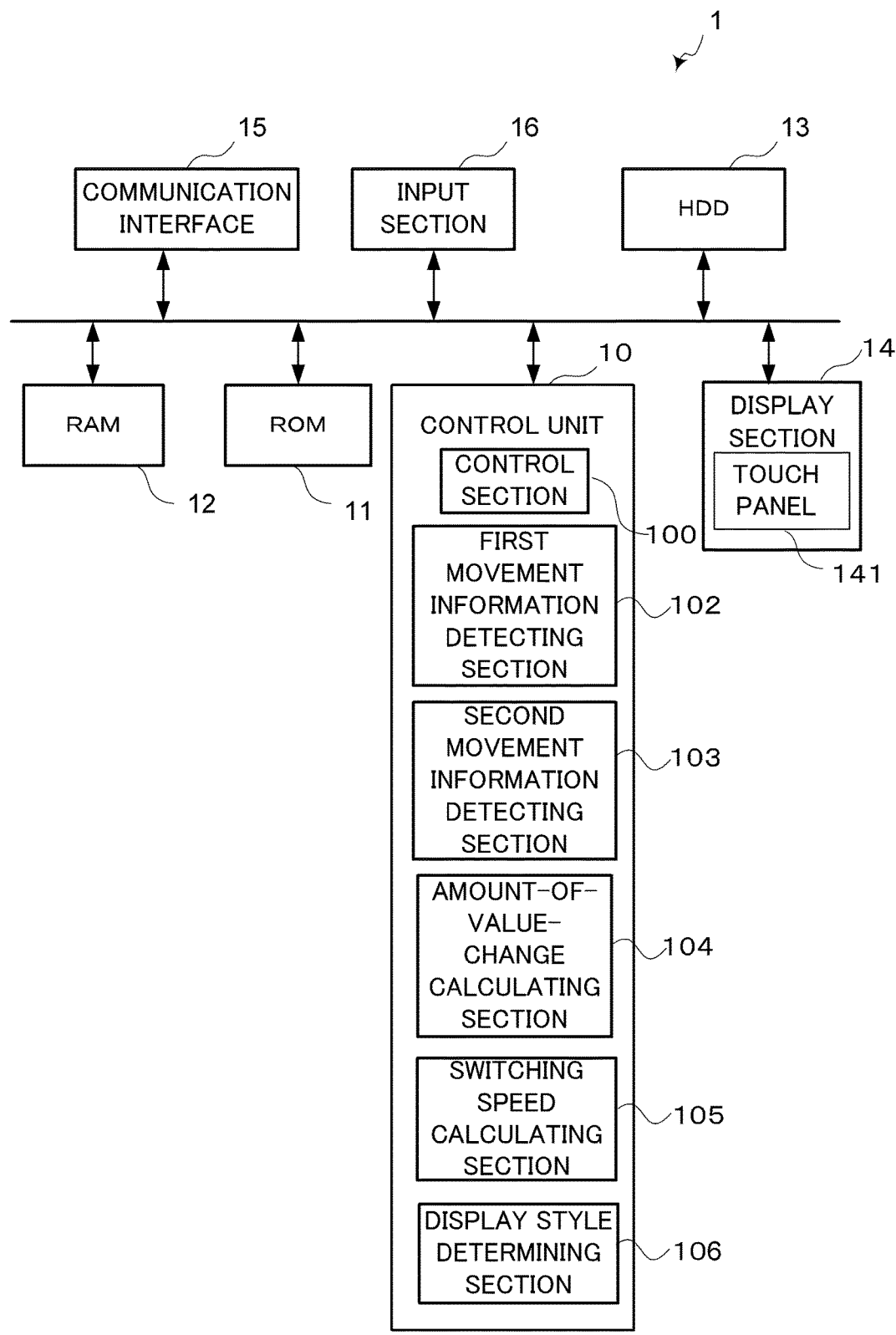
FIG. 13 is a block diagram schematically showing an internal architecture of an information processing apparatus serving as a display apparatus according to a fourth embodiment.

Next, a description will be given of a fourth embodiment of display control in an information processing apparatus 1. FIG. 13 is a block diagram schematically showing an internal architecture of the information processing apparatus 1 serving as a display apparatus according to the fourth embodiment. Further description of the same configurations as those in the first to third embodiments will be omitted.

The information processing apparatus 1 serving as the display apparatus according to the fourth embodiment, as shown in FIG. 13, further includes a display style determining section 106. The HDD 13 stores a display control program for the display apparatus according to the fourth embodiment. The control unit 10 operates in accordance with the display control program to function as the control section 100 (only for functions associated with the display control), the first movement information detecting section 102, the second movement information detecting section 103, the amount-of-value-change calculating section 104, the switching speed calculating section 105, and the display style determining section 106. Alternatively, each of the control section 100 (only for functions associated with the display control), the first movement information detecting section 102, the second movement information detecting section 103, the amount-of-value-change calculating section 104, the switching speed calculating section 105, and the display style determining section 106 of the control unit 10 may not be implemented by the operation of the control unit 10 in accordance with the display control program but may be constituted by a hardware circuit.

The display style determining section 106 is configured to determine the display style of numerical values to be displayed on the display section 14 according to the direction of movement detected by the first movement information detecting section 102. On touching the display screen of the display section 14, the operator can slide his/her finger in all directions from the initial point. In other words, the operator can select any direction as a direction of movement from the initial point toward the primary stopping point. The display style determining section 106 previously stores a 360-degree field around the initial point as a plurality of sectors of predetermined equal angle and also previously stores different display styles for the different sectors. When the first movement information detecting section 102 detects the aforementioned direction of movement, the display style determining section 106 determines the sector to which the direction of movement belongs and determines the display style stored for the sector as a display style for the direction of movement.

Figure 14:
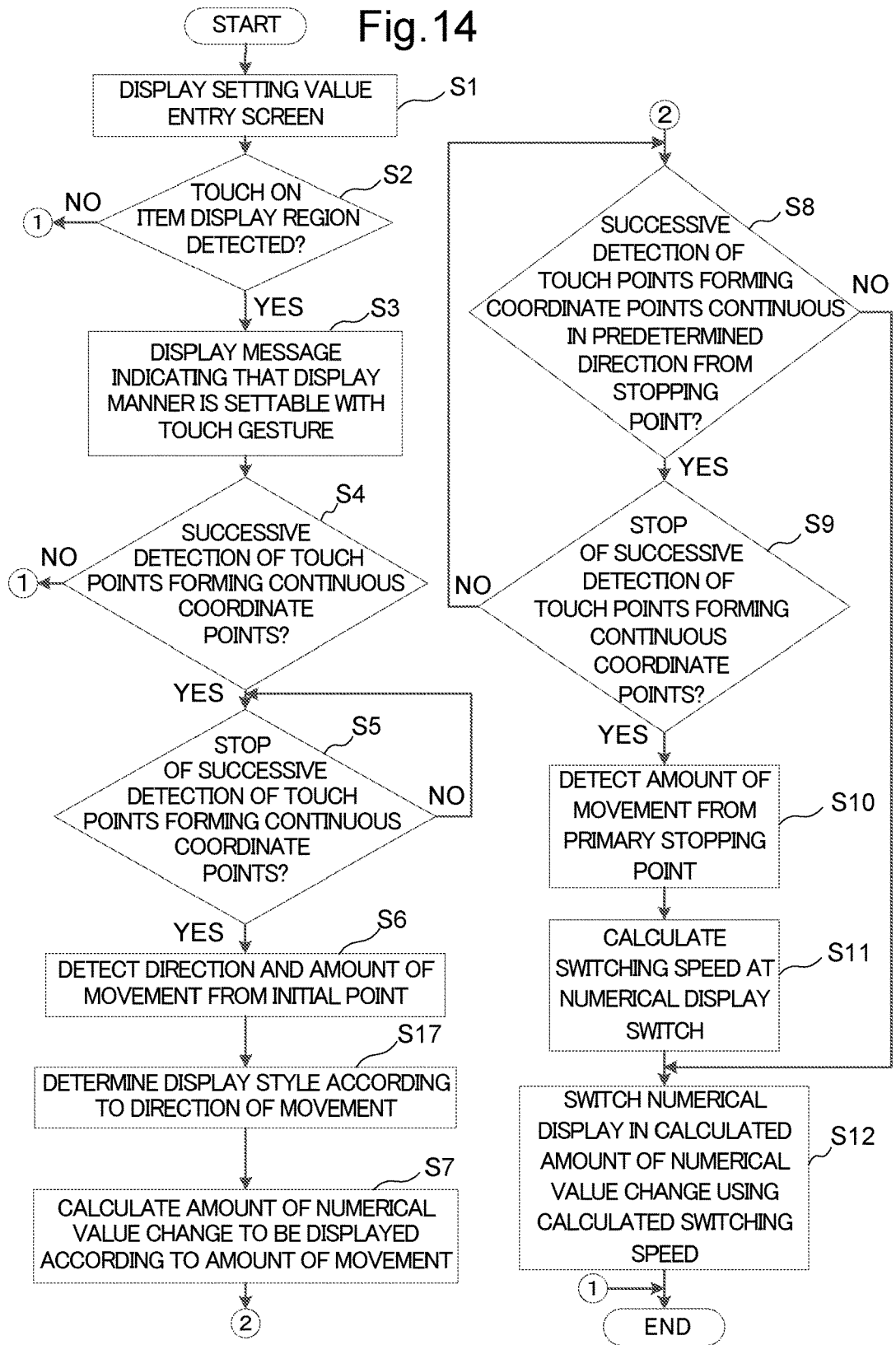
FIG. 14 is a flowchart showing display control in the information processing apparatus serving as the display apparatus according to the fourth embodiment.

Next, a description will be given of display control over the display section 14 in the information processing apparatus 1 serving as the display apparatus according to the fourth embodiment, with reference to the aforementioned figures and also to FIG. 14. FIG. 14 is a flowchart showing display control in the information processing apparatus 1 serving as the display apparatus according to the fourth embodiment. Further description of the same pieces of processing as those in the first to third embodiments will be omitted.

In the information processing apparatus 1 serving as the display apparatus according to the fourth embodiment, when in S6 the first movement information detecting section 102 detects the direction of movement, the display style determining section 106 determines the display style of numerical values to be displayed on the display section 14 according to the direction of movement detected in S6 by the first movement information detecting section 102 (S17).

Figure 15:
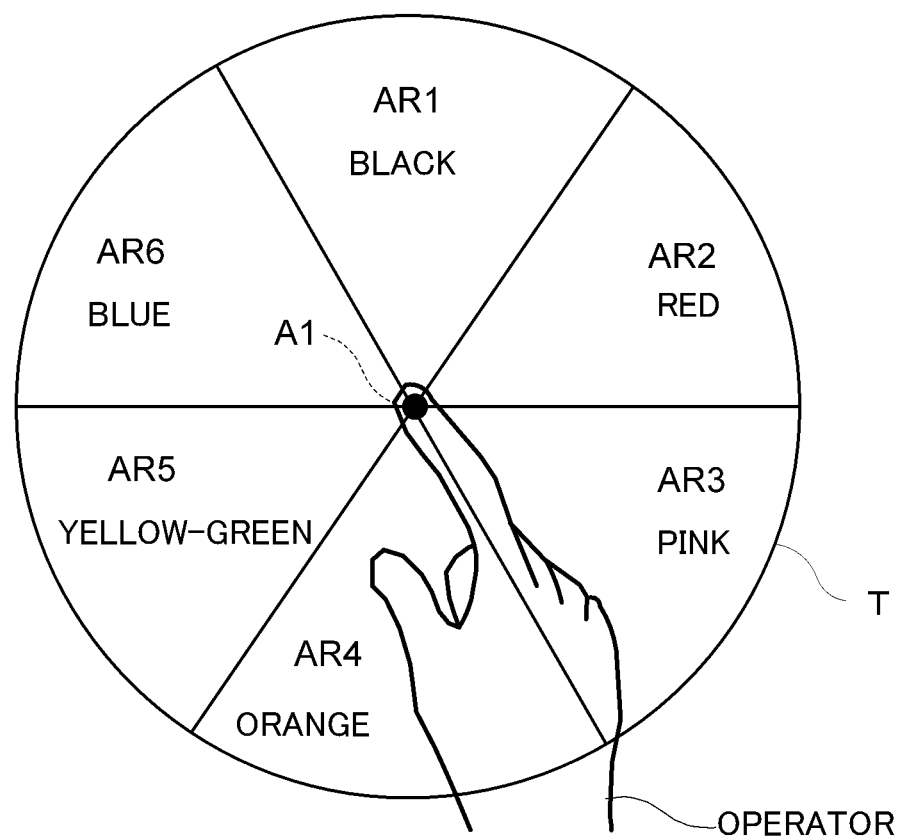
FIG. 15 is a view of an image of a table showing respective colors stored for sectors around the initial point.

FIG. 15 is a view of an image of a table showing respective colors stored for sectors around the initial point. The display style determining section 106 previously stores a 360-degree field around a single point indicated by a coordinate point as a plurality of sectors AR1 to AR6 of 60 degrees which is an example of the predetermined equal angle. The display style determining section 106 previously stores coordinate points and an individual color for each of the sectors AR1 to AR6. In this embodiment, the display style determining section 106 stores different colors associated with different sectors: black for the sector AR1, red for AR2, pink for AR3, orange for AR4, yellow-green for AR5, and blue for AR6.

Figure 16A:
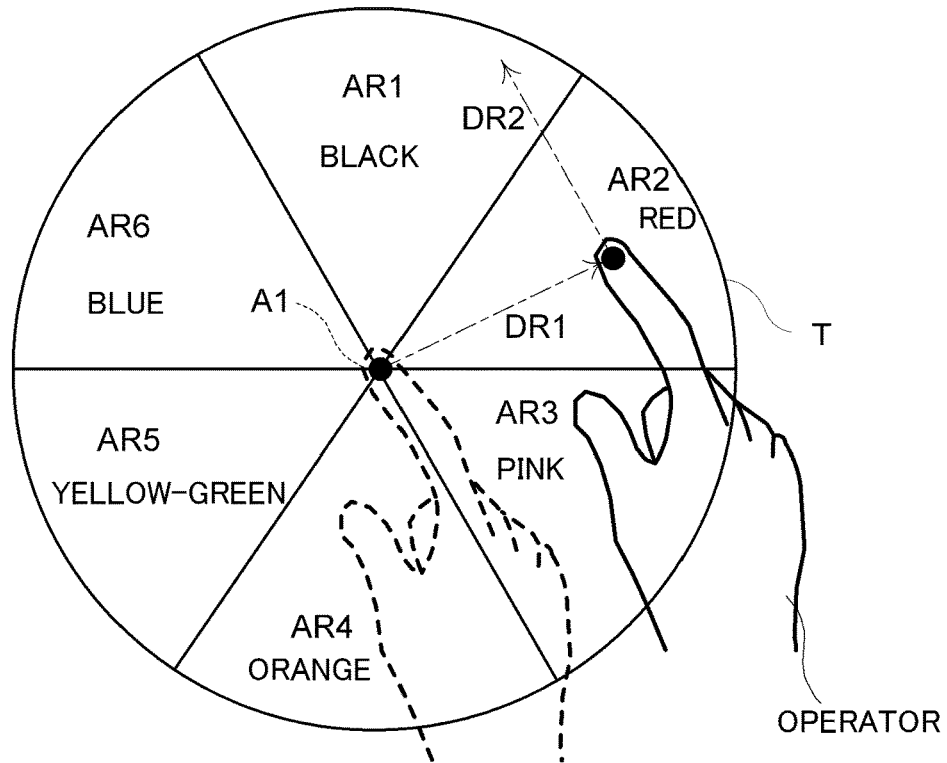
FIG. 16A is a view showing a state where the operator slides his/her finger to one of the sectors around the initial point and FIG. 16B is a view showing a state where the operator slides his/her finger to another of the sectors around the initial point.

When, in the aforementioned sliding movement from the initial point, the operator slides his/her finger, for example, in the direction shown in FIG. 16A and the direction of movement DR1 detected from the sliding movement is within the sector AR2, the display style determining section 106 determines red stored in association with the sector AR2 as a display style of the numerical values.

Figure 16B:
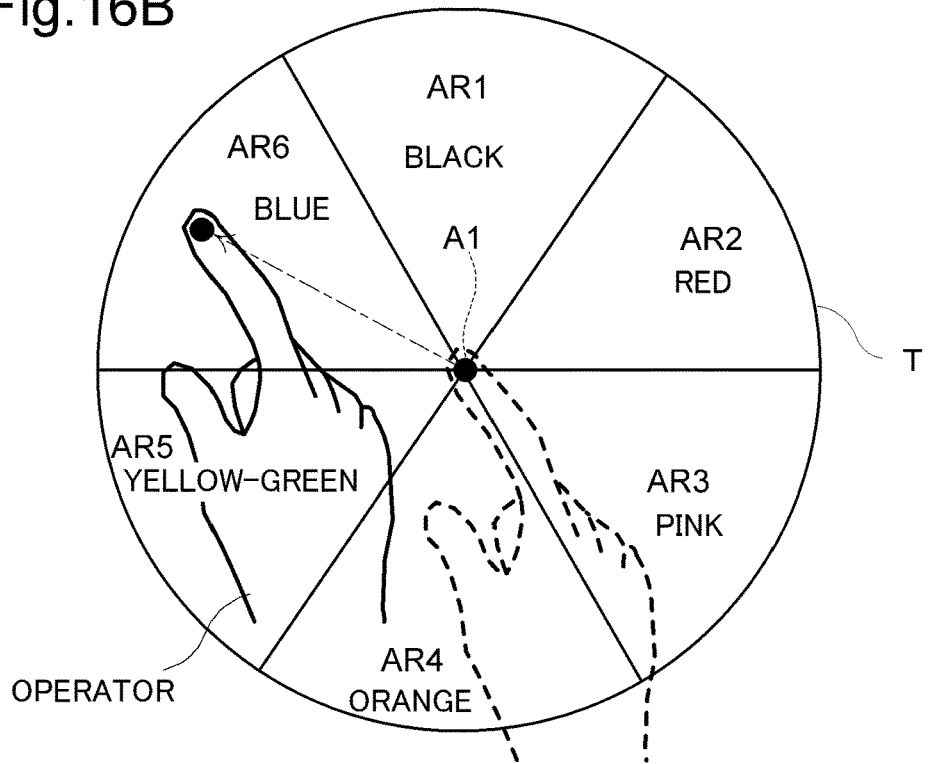

For another example, when the operator slides his/her finger in the direction shown in FIG. 16B and the direction of movement DR1 detected from the sliding movement is within the sector AR6, the display style determining section 106 determines blue stored in association with the sector AR6 as a display style of the numerical values.

The font color for use as each display style determined by the display style determining section 106 may be the color of characters representing numerical values and may be the background color of the region where the numerical values are to be displayed. The description in this embodiment takes as an example the case where the display style is the color of characters.

Figure 17:
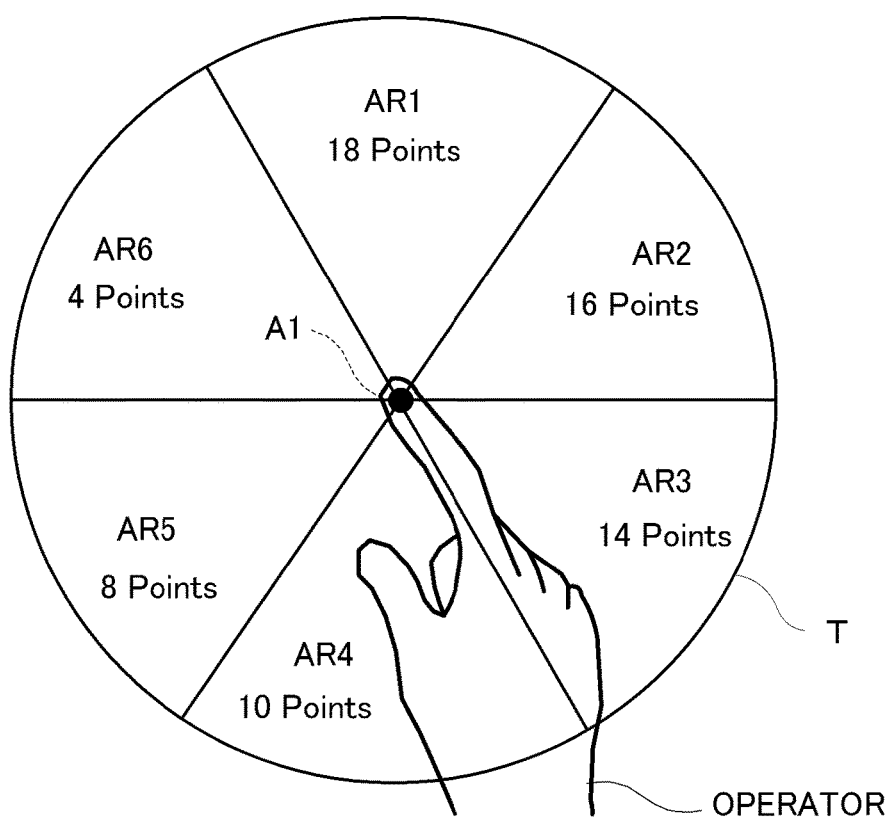
FIG. 17 is a view of an image of a table showing respective font sizes stored for sectors around the initial point.

Alternatively, the display style determining section 106 may previously store font sizes as different display styles for different sectors. FIG. 17 is a view of an image of a table showing respective font sizes stored for sectors around the initial point. For example, the display style determining section 106 stores different font sizes associated with different sectors: 18 points for the sector AR1, 16 points for AR2, 14 points for AR3, 10 points for AR4, 8 points for AR5, and 4 points for AR6. Also in this case, like the case where the display style is the font color, the display style determining section 106 determines the font size stored in association with the sector to which the direction of movement detected from the sliding movement belongs as a display style of the numerical values.

Since in this manner the display style determining section 106 determines the display style of numerical values as display objects according to the direction of movement from the initial point to the primary stopping point, the operator can change the color or size of numerical values to be displayed as setting value candidates by selecting the direction of sliding movement of his/her finger from the initial point.

The control section 100 may be configured, when the initial point is detected in S2, to allow the display section 14 to display an image of an association table T shown in FIG. 15 on the display screen. In this case, the operator can see, with the image given as a guide by the association table T, within which sector to slide his/her finger in order to select a desired display style, resulting in easier selection of a desired display style.

Furthermore, the operator can perform the aforementioned sliding movements in the two directions while selecting within which of the sectors AR1 to AR6 to take the direction of sliding movement of his/her finger from the initial point to the primary stopping point, thus also selecting the display style of numerical values to be displayed. Therefore, the operator can make, with a simple operation, flexible display settings, such as indicating the numerical values in black when they are displayed in an amount of numerical value change of 1 or indicating them in red when they are displayed in an amount of numerical value change of 10.

Next, a description will be given of another embodiment of display control in the information processing apparatus 1 serving as the display apparatus according to the fourth embodiment. FIG. 18 is a flowchart showing another embodiment of display control in the information processing apparatus serving as the display apparatus according to the fourth embodiment. Further description of the same pieces of processing as those in the information processing apparatus 1 as the display apparatus according to the first embodiment and the same pieces of processing as those shown in FIG. 14 will be omitted.

In this embodiment, when the first movement information detecting section 102 determines that the successive detection of touch points indicating coordinate points continuous from the initial point has finished (YES in S25) and detects the direction and amount of movement from the initial point to the primary stopping point (S26), the display style determining section 106 determines the display style (S127). Then, the amount-of-value-change calculating section 104 calculates a difference between a current value which is a numerical value being displayed at this point in time (a numerical value which the control section 100 allows the display section 14 to display at the time of detection of the initial point in S22) and a maximum value assignable as a setting value and a difference between the current value and a minimum value assignable as a setting value (S128). Subsequently, the same pieces of processing as those in S27 to S34 shown in FIG. 10 are performed in S128 to S135.

Also in the information processing apparatus 1 serving as the display apparatus according to the fourth embodiment, the amount-of-value-change calculating section 104 shown in FIGS. 10 and 11 can calculate the amount of numerical value change by changing the amount of numerical value change according to a number of remaining numerical values from a start value at the start of the display switch to a limit value set as a displayable limit of the plurality of numerical values.

In a general display apparatus, in order to increase the operator's visibility and operability when its display section switches the display from one to another of numerical values indicating candidates for a setting value in succession, it is preferred that the operator could change, as appropriate, the amount (width) of numerical value change and the switching speed at the display switch and could also change, as appropriate, the display style of numerical values as display objects, for example, the color, size or so on. Furthermore, the operation in changing the amount of numerical value change, the switching speed, and the display style should preferably be easy for the operator.

In the information processing apparatus 1 as the display apparatus according to the fourth embodiment, the amount of numerical value change, the display switching speed, and the display style of numerical values to be displayed one after another, on the display section 14, as candidates for a setting value for a function operable on the apparatus can be changed with a simple operation of the operator.

The present disclosure is not limited to the configurations of the above embodiments and can include various modifications. For example, although in the above embodiments the information processing apparatus 1 as typified by a personal computer has been described as one embodiment of the display apparatus according to the present disclosure, the present disclosure is not limited to this. Various types of equipment with a display section having a touch panel function, such as smartphones, mobile devices, and image forming apparatuses, can be applied as the display apparatus according to the present disclosure.

The configurations and processing shown in the above embodiments with reference to FIGS. 1 to 18 are merely illustrative of the present disclosure and the present disclosure is not intended to be limited to these configurations and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:
1. A display apparatus comprising:
a display section configured to display an image;
a touch panel configured to detect an operating point where an operator has performed an operation on a display screen of the display section; and
a control unit that is formed of a CPU, the control unit, based on execution of a display control program by the CPU,
controlling a display operation of the display section,
when the operating point as an initial point and the operating points forming coordinate points continuous from the initial point are successively detected by the touch panel and the successive detection of the operating points is then stopped, detecting first movement information indicating a direction and an amount of movement from the initial point to a primary stopping point where the successive detection is stopped,
when the operating points forming coordinate points continuous from the primary stopping point are successively detected in a predetermined direction and the successive detection of the operating points is then stopped again, detecting an amount of movement from the primary stopping point to a secondary stopping point where the successive detection is stopped again, calculating, from the amount of movement indicated by the detected first movement information, an amount of numerical value change at each display switch made in a case of allowing the display section to switch display from one to another of a plurality of numerical values in succession in increasing or decreasing order, calculating, from the detected amount of movement from the primary stopping point to the secondary stopping point, a switching speed at each display switch made in a case of allowing the display section to switch the display from one to another of the plurality of numerical values in succession in the amount of numerical value change, and allowing the display section to switch the display from one to another of the plurality of numerical values in succession in the amount of numerical value change and use the calculated-switching speed as the switching speed at the display switch from one to another of the plurality of numerical values.

2. The display apparatus according to claim 1, wherein the CPU calculates, by executing the display control program, the amount of numerical value change to be greater as the amount of movement detected is greater.

3. The display apparatus according to claim 1, wherein the CPU calculates, by executing the display control program, the switching speed to be higher as the detected amount of movement is greater.

4. The display apparatus according to claim 1, wherein the CPU calculates, by executing the display control program, the amount of numerical value change by changing the amount of numerical value change according to a number of remaining numerical values from a start value at the start of the display switch to a limit value set as a displayable limit of the plurality of numerical values.

5. The display apparatus according to claim 4, wherein the CPU changes, by executing the display control program, the amount of numerical value change associated with the amount of movement concerned with a direction toward the limit value according to a ratio of an absolute value of a difference between the start value at the start of the display switch and the limit value to the limit value.

6. The display apparatus according to claim 5, wherein when the number of remaining numerical values is smaller than a predetermined value, the CPU calculates, by executing the display control program, the amount of numerical value change associated with the amount of movement concerned with the direction toward the limit value by changing the amount of numerical value change to be smaller as the ratio is greater.

7. The display apparatus according to claim 5, wherein when the number of remaining numerical values is equal to or greater than the predetermined value, the CPU calculates, by executing the display control program, the amount of numerical value change associated with the amount of movement concerned with the direction toward the limit value by changing the amount of numerical value change to be greater as the ratio is smaller.

8. The display apparatus according to claim 1, wherein when the CPU detects a movement of the operating point a predetermined time after the first movement information detecting section detects the primary stopping point, the CPU takes, by executing the display control program, as the predetermined direction the same direction as the direction of movement detected.

9. The display apparatus according to claim 1, wherein the CPU
determines, by executing the display control program, a display style of numerical values to be displayed on the display section according to the direction of movement detected, and
allows the display section to switch the display from one to another of the plurality of numerical values in succession in the calculated amount of numerical value change using the display style determined and uses the calculated switching speed as the switching speed at the display switch from one to another of the plurality of numerical values.

10. The display apparatus according to claim 9, wherein when the CPU detects, by executing the display control program, the initial point, the CPU allows the display section to display an image representing association between the direction of movement and the display style.

11. A computer-readable non-transitory recording medium with a display control program recorded thereon, the display control program allowing a computer to execute:
a display controlling step of controlling a display operation of a display section;
an operating point detecting step of detecting an operating point where an operator has performed an operation on a display screen of the display section;
a first movement information detecting step of, when the operating point as an initial point and the operating points forming coordinate points continuous from the initial point are successively detected in the operating point detecting step and the successive detection of the operating points is then stopped, detecting first movement information indicating a direction and an amount of movement from the initial point to a primary stopping point where the successive detection is stopped;
a second movement information detecting step of, when the operating points forming coordinate points continuous from the primary stopping point are successively detected in a predetermined direction and the successive detection of the operating points is then stopped again, detecting an amount of movement from the primary stopping point to a secondary stopping point where the successive detection is stopped again;
an amount-of-value-change calculating step of calculating, from the amount of movement detected in the first movement information detecting step, an amount of numerical value change at each display switch made in a case of allowing the display section to switch display from one to another of a plurality of numerical values in succession in increasing or decreasing order; and
a switching speed calculating step of calculating, from the amount of movement detected in the second movement information detecting step, a switching speed at each display switch made in a case of allowing the display section to switch the display from one to another of the plurality of numerical values in succession in the amount of numerical value change, wherein the display control program further allows the computer to function so that in the display controlling step, the display section is allowed to switch the display from one to another of the plurality of numerical values in succession in the calculated amount of numerical value change and the calculated switching speed is used as the switching speed at the display switch from one to another of the plurality of numerical values.

12. The computer-readable non-transitory recording medium with the display control program recorded thereon according to claim 11, wherein
    the display control program further allows the computer to:
    execute a display style determining step of determining a display style of numerical values to be displayed on the display section according to the direction of movement detected in the first movement information detecting step; and
    function so that in the display controlling step, the display section is allowed to switch the display from one to another of the plurality of numerical values in succession in the calculated amount of numerical value change using the display style determined in the display style determining step and the calculated switching speed is used as the switching speed at the display switch from one to another of the plurality of numerical values.

\* \* \* \* \*